United States Patent [19]
Tozawa et al.

[11] Patent Number: 4,809,999
[45] Date of Patent: Mar. 7, 1989

[54] TUBULAR FRAME MEMBER

[75] Inventors: Hideaki Tozawa, Tokyo; Jitsuji Kawada, Saitama, both of Japan

[73] Assignee: Honda Giken Kogyo Kabushiki Kaisha, Tokyo, Japan

[21] Appl. No.: 21,825

[22] Filed: Mar. 4, 1987

[30] Foreign Application Priority Data

Mar. 4, 1986 [JP] Japan .................... 61-046994
Mar. 5, 1986 [JP] Japan .................... 61-048042

[51] Int. Cl.⁴ .................................. B62K 3/04
[52] U.S. Cl. .......................... 280/281.1; 403/274; 228/173.4; 180/219
[58] Field of Search ......... 280/281 R; 403/49, 274; 180/219; 29/155; 72/367; 228/173.4

[56] References Cited

U.S. PATENT DOCUMENTS

| 3,173,196 | 3/1965 | Grimm | 72/367 |
| 3,508,765 | 4/1970 | Bauer et al. | 280/281 R |
| 4,049,082 | 9/1977 | Reid | 29/150 |
| 4,129,317 | 12/1978 | Bell | 280/281 R |
| 4,473,318 | 9/1984 | Schrock | 403/49 |

Primary Examiner—David M. Mitchell
Assistant Examiner—Donn McGiehan
Attorney, Agent, or Firm—Lyon & Lyon

[57] ABSTRACT

A tubular frame member forming a part of a vehicle body structure is formed at one end portion with a joint end portion adapted to joint the tubular member with another member. This joint end portion comprises depressed portions formed by opposite wall portions folded inwardly in two along widthwise intermediate portions respectively and remaining opposite wall portions sandwiching the depressed portions from both sides. The depressed portions and the remaining opposite wall portions are crushed together.

3 Claims, 7 Drawing Sheets

TUBULAR FRAME MEMBER

BACKGROUND OF THE INVENTION

This invention relates to a tubular frame member. More particularly, it relates to a joint end portion of a tubular frame member used as a part of a vehicle body frame structure of a motorcycle, which is to be jointed with another member.

There are known various joint portions, particularly weld-joint portions of tubular members which form a part of a vehicle body frame structure of a motorcycle. Examples of such frame members are disclosed in Japanese utility model publication No. 49-4428, Japanese early laid-open utility model publication No. 53-128653 and Japanese utility model publication No. 56-48631.

A weld-joint portion of a frame of the Japanese utility model publication No. 49-4428, as shown in FIG. 11, has a weld-joint portion 01A of a saddle pipe 01 which is formed of a round-pipe crushed so as to be jointed with a main pipe 02 and a weld-joint portion 03A of a supporting pipe 03 which is also formed of a round pipe crushed so as to be jointed with the main pipe 02.

A weld-joint portion of a sub-tube on which a seat is placed of the Japanese early laid-open utility model publication No. 53-128653, as shown in FIG. 12, comprises a plate portion 04A formed of a sub-tube 04 crushed and a rib 04B formed on the widthwise central portion of the plate portion 04A. A weld-joint portion of a frame of the Japanese utility model publication No. 56-48631, as shown in FIG. 13, is constituted as such that a weld-joint portion 06A of a rear upper pipe 06 to be welded to a main pipe 05, a weld-joint portion 07A of a center pipe 07 and a weld-joint portion 08A of a rear lower pipe 08 to be welded to a down tube 09 are all formed of a pipe material crushed and are wider than the diameters of the respective pipes.

There is also known a vehicle body frame structure as shown in FIG. 14 for example, in which a main frame 011 connected with a head pipe 010 is connected with a seat rail frame 012 and a sub-frame 013 and tightened by bolts 014 respectively and a lower end portion of a down tube 015 connected with a head pipe 010 is secured to a lower part of a main frame 011 by bolt 014.

The structure of the joint end portions of these frames 012, 013 and 015 to be jointed with other members is as such that, as shown in FIG. 15, a joint member 016 is engaged with a pipe hole and fixed therein by welding means 017 or otherwise, as shown in FIG. 16, an inner pipe 018 is fitted into a pipe hole, and the end portion thereof is crushed and such crushed end portion is formed with a bolt hole 019, and, in addition, a hole 020 for withdrawing a liquid for painting within the pipe hole is formed on the pipe.

However, the conventional tubular frame members with one ends crushed as shown in FIGS. 12 through 14 have a disadvantage in that the rigidity of the joint end portions becomes weak compared with that of the pipe portions due to the fact that their thicknesses are no more than twice of the thickness of tubular materials.

Another disadvantage of the above conventional tubular frame members is as follows. The joint end portion becomes extremely wide compared with that of the diameter of the pipe. Therefore, when this wide portion is abutted against the peripheral surface of the main pipe 02 of FIG. 11 for example and welded, the contacting surface of the joint end portion is required to be so worked as to curve along the peripheral surface and the welding area becomes vast. Particularly, when a square-shaped frame member is employed, the joint end portion becomes extremely wide. For example, when the square pipe member has a regular square shape in section, the width of the compressed joint end portion becomes two times as wide as the width of one side of the pipe member. Therefore, the welding workability and outer appearance become poor and thus undesirable. Moreover, since the difference in thickness between the compressed joint end portion and the square pipe is large, there arises a problem in that the joint end portion is required to be made long enough in order to weld the joint end portion along the peripheral surface of the member it is to be connected with.

When the compressed joint portion is formed with a bolt hole 019 as shown in FIG. 16, it is difficult to form, for example, an internal thread in the bolt hole 019 since the joint end portion is thin and therefore the inner pipe 018 is required to be fitted therein, thus resulting in an increase in the required working steps and parts.

On the other hand, the conventional tubular frame member of FIG. 15 in which the joint member 016 is welded to the tubular end portion requires an increased number of parts. In addition, a working step for welding 017 applied to the contacting portion between the tubular frame member and the joint member 016 is required, which again results in higher cost.

SUMMARY OF THE INVENTION

The object of the present invention is to provide a tubular frame member in which a pipe material used in the conventional member can be used and yet the joint end portion thereof is about twice as thick as the conventional one, while the width is about the same as the diameter of the pipe.

In order to achieve the above object, the joint end portion of a tubular frame member according to the present invention comprises a tubular member having opposite wall portions folded inwardly in two along widthwise intermediate portions, respectively, and the folded portions depressed into a pipe hole, the remaining wall portions sandwiching the depressed portions from outside being crushed toward the respective depressed portions. Preferably, a space for withdrawing liquid communicating with the pipe hole of the tubular frame member is formed between the opposite depressed portions.

As one example, when a joint end portion according to the present invention is formed at one end portion of a square-shaped frame member, the opposite upper and lower wall portions are folded inwardly in two, respectively, by providing the widthwise central portions as folding lines and depressing them inwardly toward the pipe hole, the right and left side walls sandwiching the upper and lower depressed portions and being compressed toward the depressed portions. The width of such crimped joint end portion is equal to the height of the side walls, while the thickness thereof becomes so thick that it is equal to the thickness of the side walls plus the thickness of the depressed portions. In other words, the thickness of the joint end portion is about twice as thick as that of a pipe merely compressed. As a result, the bending strength in the direction perpendicular to the flattened plane of the joint end portion becomes nearly twice as strong as that of the prior art. Moreover, since the joint end portion has such a large thickness as mentioned, an internal thread may be formed in the bolt hole which is defined in the joint end portion without spoiling the durability.

The aforementioned space for withdrawing liquid is used when the surface within the pipe hole of the tubular frame member is treated.

DETAILED DESCRIPTION OF THE PREFERRED EMBODIMENTS

Figure 1:
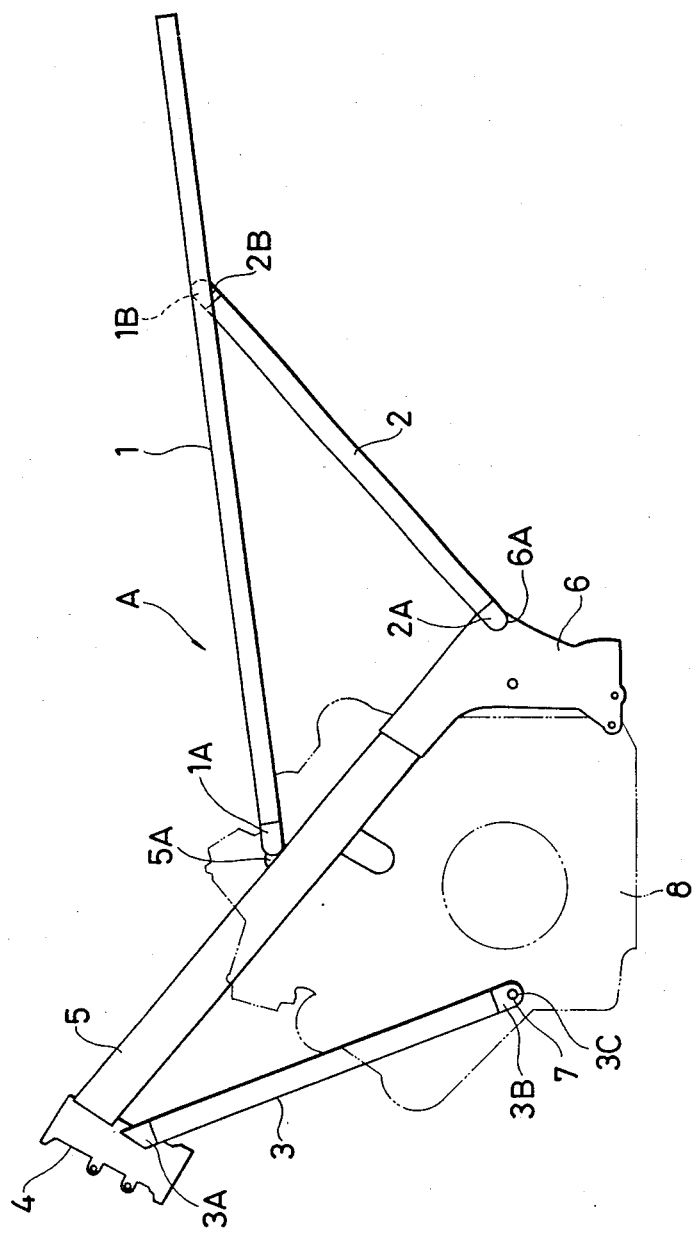
FIG. 1 is a side view of a vehicle body frame structure of a motorcycle in which tubular frame members are welded together.

FIG. 1 shows a vehicle body frame structure of a motorcycle. A head pipe 4 and a pivotal portion 6 are integrally connected through a main pipe 5 stretched therebetween. The main pipe 5 is provided with a mounting seat 5A at its generally central upper portion in the longitudinal direction. A joint end portion, e.g., weld connecting portion 1A, of a seat rail 1 is secured to the mounting seat 5A by welding. A second mounting seat 6A is formed on an upper part of the pivotal portion 6. A weld connecting portion (joint end portion) 2A of a sub-frame 2 is secured to the second mounting seat 6A by welding. The sub-frame 2 is formed at its upper end portion with a weld connecting portion (joint end portion) 2B which is secured to a mounting place 1B of the seat rail 1 by welding. The head pipe 4 is secured with a weld connecting portion (joint end portion) 3A which is formed on an upper end of a down tube 3 through welding. The down tube 3 is formed at its lower end portion with a joint end portion 3B. The joint end portion 3B is formed with a bolt hole 3C and secured to an engine 8 by a bolt 7 pierced through the bolt hole 3C.

Figure 2:
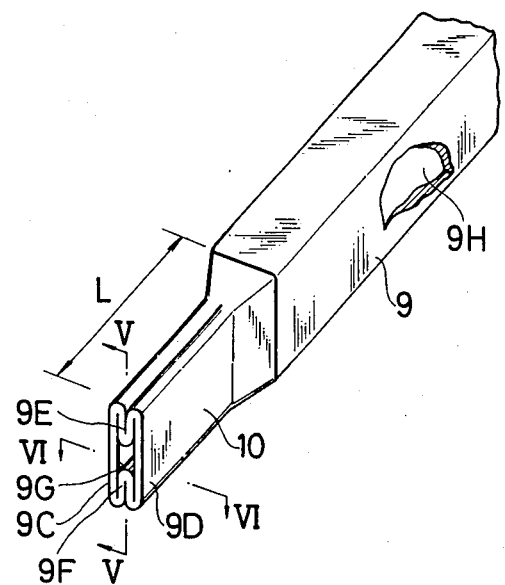
FIG. 2 is a perspective view of a tubular frame member.
Figure 3:
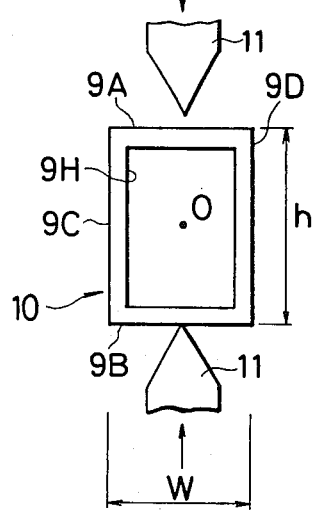
FIG. 3 is an end face view of a tubular frame member which is in the state immediately before working.
Figure 4:
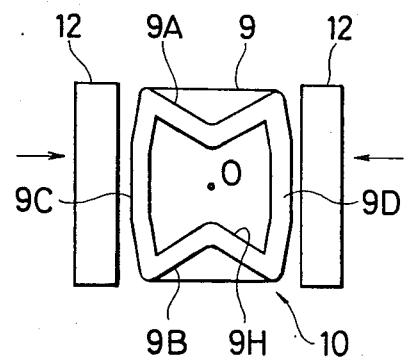
FIG. 4 is an end face view of the tubular frame member after a first working.

The aforementioned seat rail 1, sub-frme 2 and down tube 3 forming a part of a vehicle body frame structure A have the same structure as the one which is shown as a tubular frame member 9 in FIG. 2. The tubular frame member 9 has a square shape in section. The tubular frame member 9 is provided with a weld connecting portion 10 at one end. The weld connecting portion 10 is formed by pressing a portion having a predetermined length L at one end of the the tubular frame member 9. Although the weld connecting portion 10 is formed at one end of the tubular frame member 9 in this embodiment, it may of course be formed at both ends thereof. This weld connecting portion 10 corresponds to any of the portions designated by reference symbolic numerals 1A, 2A, 2B, 3A and 3B shown in FIG. 1. FIG. 3 shows an end face view of this weld connecting portion 10 before pressing. In FIG. 3, opposite upper wall 9A and lower wall 9B are pressed toward the center O of a pipe hole 9H by press molds 11, 11 placed at widthwise central portions of the walls 9A and 9B. The result is that the upper wall 9A and lower wall 9B are folded in two at widthwise intermediate portions as shown in FIG. 4. When the resultant is pressed toward the inside of the pipe hole 9H from outside of the side walls 9C and 9D by press molds 12, 12, the upper wall 9A and lower wall 9B are depressed inwardly of the pipe hole 9H as shown in FIG. 2. Due to the foregoing, such depressed portions 9E and 9F are intimately sandwiched between the side walls 9C and 9D. The thickness of the weld connecting portion 10 is four times as thick as the wall thickness of the tubular frame portions.

Figure 5:
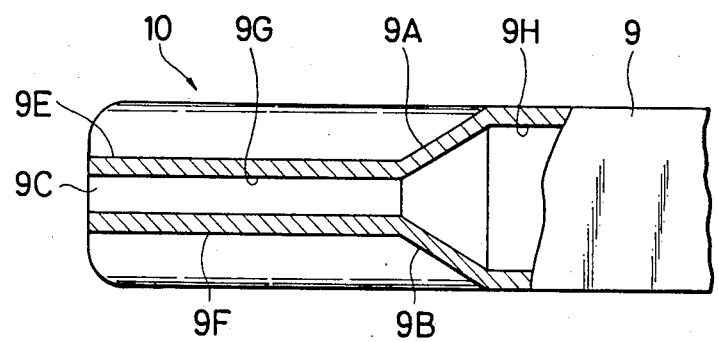
FIG. 5 is a sectional view taken on line V—V of FIG. 2.
Figure 6:
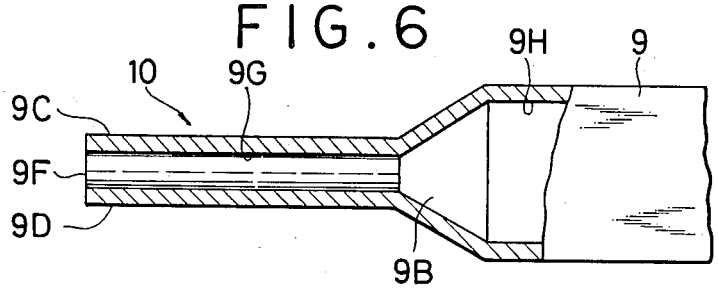
FIG. 6 is a sectional view taken on line VI—VI of FIG. 2.

In FIG. 2, between both the opposite depressed portions 9E and 9F, a liquid withdrawal space 9G communicating with the pipe hole 9H is formed as shown in FIGS. 5 and 6. This space 9G is necessarily formed when the height h (FIG. 3) of the side wall 9D is longer than the width W of the lower wall 9B.

As is apparent from the constitution described in the foregoing, according to the present invention, the weld connecting portion 10 formed at an end portion of the tubular frame member 9 is formed in such manner that pipe walls opposite in one direction are folded in two at widthwise intermediate portions toward the pipe hole, while the remaining walls opposite in the perpendicular direction are compressed toward each other. Accordingly, the thickness of the weld connecting portion 10 becomes so thick that it is equal to the thickness of four pipe walls overlapped. This means that the bending strength in the direction of the thickness becomes large and yet the width of the weld connecting portion 10 does not become larger than the diameter of the tubular portion.

The liquid withdrawal space 9G formed between both the depressed portions of the weld connecting portion 10 can be used when liquid for surface treatment with respect to the internal hole of the tubular frame member 9 is withdrawn.

Although the seat rail 1, sub-frame 2, and down tube 3 are shown in FIG. 1 as tubular frame members forming the vehicle body frame structure A, other frame members, not shown may be formed the same the tubular frame member 9 of FIG. 2.

Figure 7:
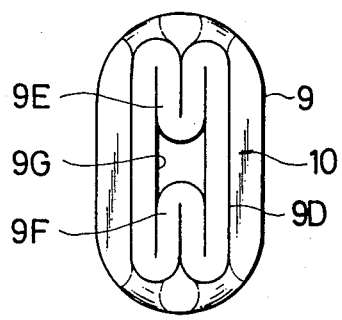
FIG. 7 through FIG. 9 are end face views showing modified embodiments of a joint end portion respectively.
Figure 8:
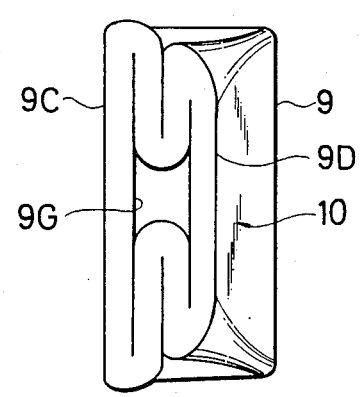
Figure 9:
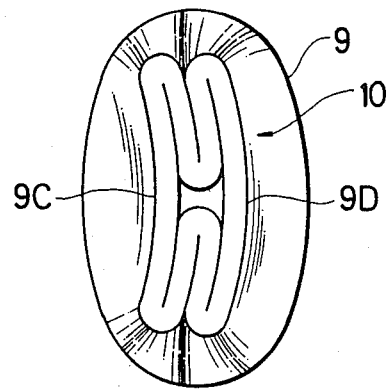

FIGS. 7 through 9 are end face views of modified embodiments of the weld connecting portion 10 described in connection with the preceding embodiment, in which the same portions to those of the preceding emboidment are designated by the same reference numerals. FIG. 7 shows the same weld connecting portion 10 as that of the preceding embodiment formed on a tubular frame member 9 which has a round shape in section. The weld connecting portion 10 of FIG. 8 is formed on a tubular frame member 9 having a square shape in section, the same as with the preceding embodiment. In the figure, however, a left side wall 9C and a right side wall 9D are different in height and the left plane of the side wall 9C is disposed in generally the same plane with respect to the left plane of the main body portion of the tubular frame member 9. This arrangement is such that when the weld connecting portion 10 is welded to the planar side of another frame member, the weld connecting portion 10 can be easily disposed along the side of the other frame member without being disturbed by the main body portion. Accordingly, the length L (FIG. 2) of the weld connecting portion 10 can be made short. The weld connecting portion 10 of FIG. 9 is formed on a tubular frame member having a round shape in section. However, the side walls 9C and 9D are curved so as to be easily welded to the peripheral surface of a round-shaped tubular frame member to be connected with.

The tubular frame member 9 which includes the above-mentioned weld connecting portion 10 has the following excellent effects.

A. Since the weld connecting portion can be made thick enough, the bending strength can be increased in the direction of its thickness.

B. Since the width of the weld connecting portion does not become larger than the diameter of the tubular frame member, there can be obtained an excellent apperance as well as an easy mounting. In addition, the assembling performance can be improved since the welding area is small.

C. Since a tubular frame material can be readily formed into an intended weld connecting portion without using other materials, the invention can be easily put into actual practice.

Figure 10:
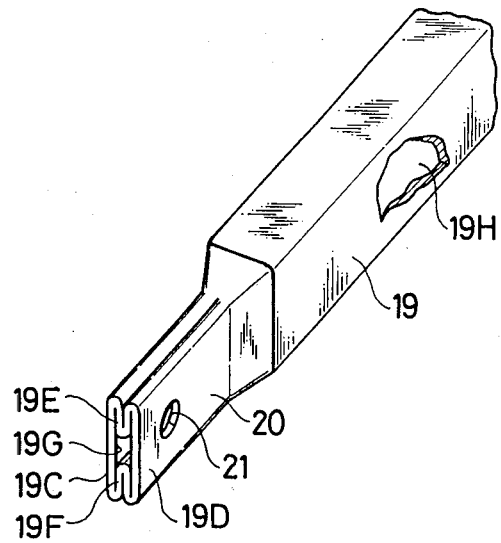
FIG. 10 is a perspective view of a tubular frame member according to another embodiment of the present invention.
Figure 11:
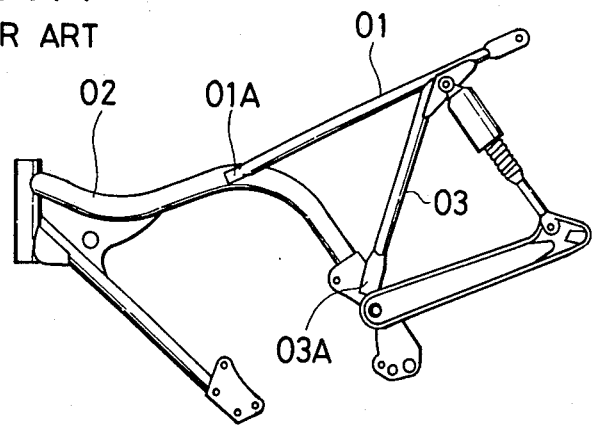
FIG. 11 through FIG. 16 are perspective views showing conventional tubular frame members respectively.
Figure 12:
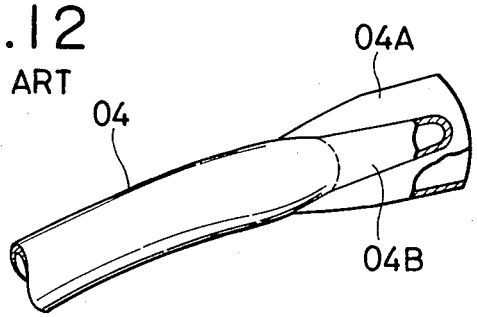
Figure 13:
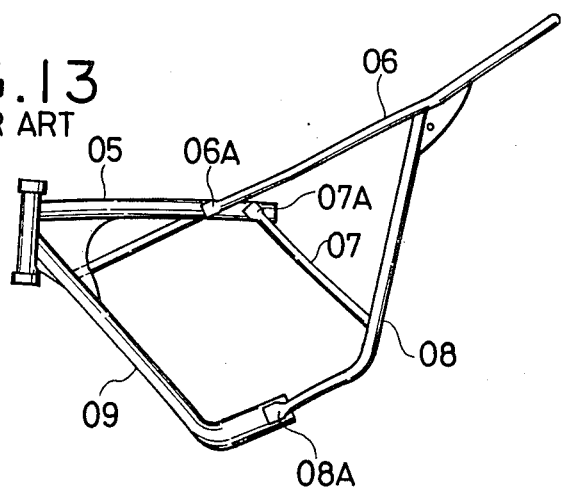
Figure 14:
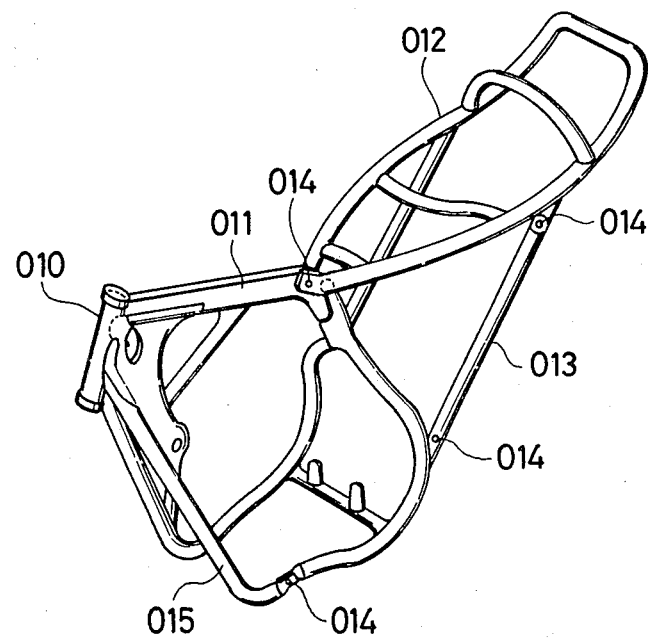
Figure 15:
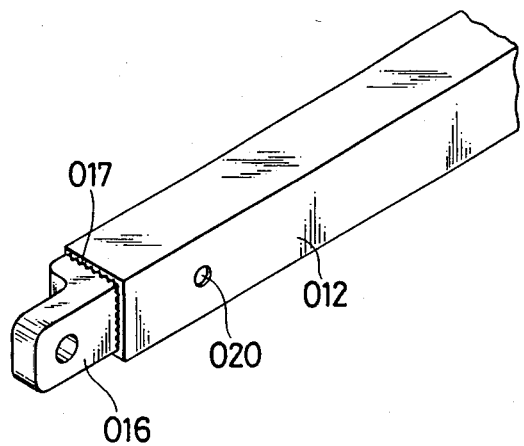
Figure 16:
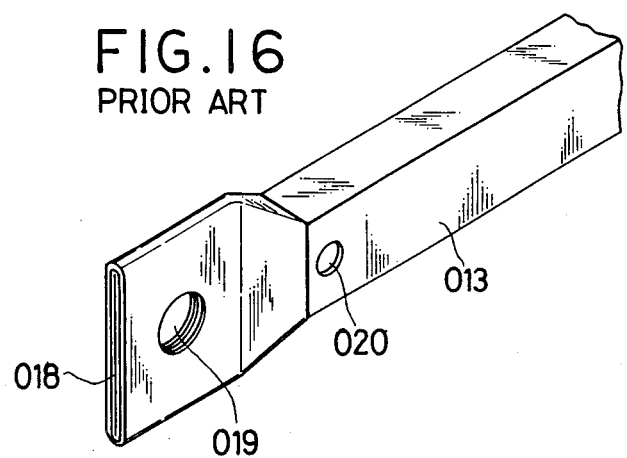

FIG. 10 shows another embodiment of the present invention. The tubular frame member 19 of this embodiment is provided with a joint end portion 20 so that it can be jointed with an objective frame member by bolt means. This joint end portion 20 has generally the same structure as that of the aforementioned weld connecting portion 10. More specifically, the joint end portion 20 is formed in a flat shape by compressing the side walls 19C and 19D from outside with both the depressed portions 19E and 19F sandwiched therebetween and a liquid withdrawal space 19G communicating with the pipe hole 19H formed between the upper and lower depressed portions 19E and 19F. In addition, a bolt hole 21 is formed at the joint end portion 20 for permitting a bolt to pierce therethrough. Since the joint end portion 20 is thick enough as a whole as described with respect to the weld connecting portion 10, an internal thread can be formed in the bolt hole 21 without spoiling the durability.

What is claimed is:

1. A generally hollow, cylindrical tubular frame member for lap-joinder in substantially axially aligned relation with another member having an arcuate exterior surface, said tubular frame member having a joint end portion formed to engage said exterior surface in overlying relation, said joint end portion comprising:

oppositely disposed first wall portions folded inwardly along lines intermediate the ends thereof;

second wall portions continuous with said first wall portions and substantially perpendicularly disposed with respect thereto, said second wall portions being pressed with said first wall portions inwardly to form substantially contiguous, parallel layers of said first wall portions sandwiched between said second wall portions and arcuate about an axis parallel to the longitudinal axis of said tubular frame member.

2. A tubular frame member as claimed in claim 1 including a bolt hole formed by coaxially aligned openings in said wall portion layers.

3. A tubular frame member as claimed in claim 2 wherein said bolt hole contains an internal thread.

* * * * *